March 20, 1945.  H. E. DICKERMAN  2,371,742
MEASURING APPARATUS
Filed Jan. 25, 1944
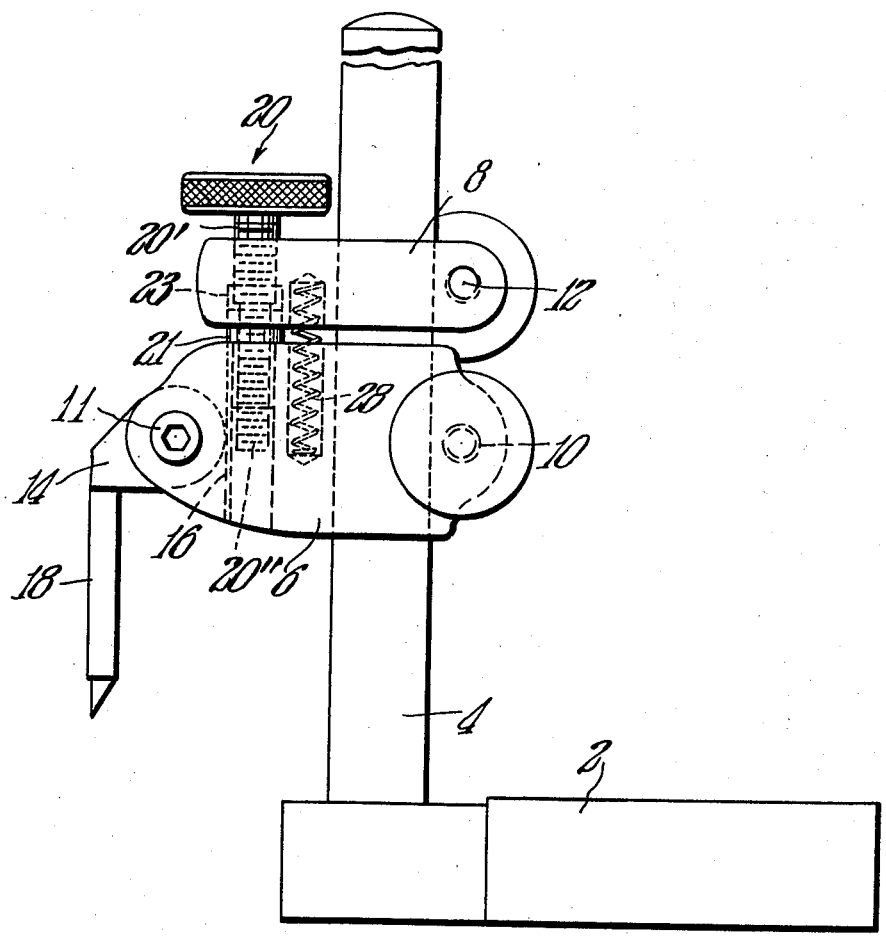
INVENTOR.
Hubert E. Dickerman.
BY Walter C. Ross,
Attorney.

Patented Mar. 20, 1945

2,371,742

UNITED STATES PATENT OFFICE 2,371,742

MEASURING APPARATUS

Hubert E. Dickerman, Springfield, Mass.

Application January 25, 1944, Serial No. 519,631

1 Claim. (Cl. 33—170)

This invention relates to improvements in measuring apparatus and is directed more particularly to height gages or apparatus for measuring or comparing the measurements of objects such as comparing the measurements of one object with another.

This application is a continuation in part of an application filed by me on December 8, 1942, Serial No. 468,206.

The principal objects of the invention are directed to the provision of apparatus which is characterized by its novel construction so as to be adapted for many and various uses and is so constructed and arranged as to provide the utmost in accuracy, rigidity and ease of operation.

With the foregoing and various other novel advantages and objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

The figure is a side elevational view of a measuring apparatus embodying the novel features of the invention.

Referring now to the drawing more in detail, the invention will be fully described.

A platform or base 2 is provided which may serve as a support for the apparatus while at the same time it may serve as a table for supporting objects for purposes of measurement or comparison.

A column or post 4 extends upwardly from the base 2 which is secured rigidly thereto in some convenient and desired manner.

Lower and upper brackets 6 and 8 are arranged for sliding and rotating movements on the post 4 and each at one end, such as the right end, is slotted and provided with binding screws 10 and 12 engaging the said end parts, whereby the brackets may be clamped to the post against movement.

The brackets may, of course, be loosened and swung to a position above the platform 2.

A member 14 is pivoted in a slot of the left hand end of member 6 and a binding screw 11 is provided for clamping the member 14 in the desired position.

A member 18 is fixed to member 14 and is adapted to carry an indicating device commonly used in making measurements or it may be used as a feeler. Such indicating devices as are referred to have a dial indicator and a contact member in the form of a lever for contacting objects which is operably connected to the dial mechanisms so that movements of the contact member are indicated on the dial. A movement of a very small fraction of an inch is represented by a considerable arc of movement of the dial indicator.

It may be desired in some cases to remove the member 14 and clamp an indicator directly to the member 6.

An adjusting screw 20 has a manually engageable part, as shown, and separate screw parts 20' and 20''. The threaded part 20' is in threaded engagement with bracket 8. The threaded part 20'' is in threaded engagement with a bushing 21 of bracket 6.

Preferably the screw parts 20' and 20'' are of different characteristics such as having threads of different pitches. A spring 28 is disposed in suitable sockets or spring seats of the brackets 6 and 8, as shown, and urges the brackets apart as well as resists movements thereof towards one another.

Either one of the brackets may be clamped to the post 4 and the other bracket may be moved relative thereto along the post by rotation of the screw 20.

By providing a screw having threaded parts of different pitch it requires a considerable angle of rotation of the screw to move the brackets relative to one another, at least a greater angle than were the screw held for rotation in one bracket and threaded in the other. This is very desirable since it is possible to move the bracket through extremely small distances, while the spring 28 overcomes backlash and lost motion to enhance accuracy in operation.

The upper end of bushing 21 is disposed in a socket 23 of bracket 8 and the fit of such bushing in the socket is such that the brackets are movable towards and away from one another but are held against relative swinging movements. Should the threaded portions of the screw 20 wear or should the threaded parts of the brackets wear so as to produce looseness relative swinging movements would develop to impair the accuracy. By providing the bushing of one bracket that is slidably receivable in a socket of the other bracket relative swinging movements are overcome.

When a dial indicator is associated with the member 18 it is possible to measure or compare one object with another standard such as a certain standard both of which may be supported on the base 2. The lever or contact member of an indicator when it is attached to the member 18 is used to contact the objects and the screw 20 is manipulated to move the bracket 6 up and down relative to the bracket 8. The member 18 may, of course, be used to contact an object or objects.

The screw 20 may take various forms as may be desired, the adjacent threaded parts may be of the same or different diameters and the pitches of the threaded parts may be arranged in any desired relation it being desired to make relatively great angular movements of the screw necessary in order to obtain relatively small relative movements of the brackets thereby providing extreme accuracy while the spring enhances fineness of operation and enhances accuracy.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A measuring apparatus comprising in combination, a platform having a post extending upwardly therefrom, separate brackets slidable and rotatable on said post each having clamping means for securing the same in adjusted positions on said post, adjacent sides of said brackets provided with spring seats and a spring between said seats to urge the brackets apart, a member on one bracket slidable in a socket provided in the other bracket to hold said brackets against relative swinging movements, screw means having separate threaded portions of different characteristics, one of said threaded portions threadedly engaging said member and the other threaded portion threadedly engaging said other bracket.

HUBERT E. DICKERMAN.